United States Patent
Reiff et al.

[11] Patent Number: 5,406,038
[45] Date of Patent: Apr. 11, 1995

[54] SHIELDED SPEAKER

[75] Inventors: David E. Reiff; Mac W. Branan, both of Ft. Lauderdale, Fla.

[73] Assignee: Motorola, Inc., Schaumburg, Ill.

[21] Appl. No.: 188,976

[22] Filed: Jan. 31, 1994

[51] Int. Cl.$^6$ .................. G10K 13/00; H04R 7/00
[52] U.S. Cl. .................... 181/167; 181/168
[58] Field of Search .............. 181/167, 168, 157; 381/193, 202

[56] References Cited

U.S. PATENT DOCUMENTS

| | | | |
|---|---|---|---|
| 3,938,618 | 2/1976 | Ambruoso, Sr. | 181/155 |
| 4,081,631 | 3/1978 | Feder | 200/5 A |
| 4,112,168 | 9/1978 | Schafft | 428/198 |
| 4,470,479 | 9/1984 | Inoue et al. | 181/168 |
| 4,713,277 | 12/1987 | Akiyama et al. | 181/168 X |
| 4,847,981 | 7/1989 | Suzuki et al. | 181/167 X |

*Primary Examiner*—Richard A. Wintercorn
*Attorney, Agent, or Firm*—Dale W. Dorinski

[57] ABSTRACT

Briefly, according to the invention, there is provided a shielded speaker. The speaker (10) has a diaphragm (18) coated with a metal layer (28). The coated diaphragm prevents the transmission of unwanted electromagnetic or radio frequency radiation from the front side (22) of the speaker to the rear side (24) of the speaker. In an alternate embodiment of the invention, a shielded electronic device is provided. The device consists of a housing (40) that has an opening (42) for a speaker (10) and a shielding means (44) contained within the housing. The speaker has a diaphragm coated with a metal layer. Disposed within the housing is an electronic device that is susceptible to or emits electromagnetic radiation. The electronic device (46) is coupled to the speaker and the speaker is mounted in the housing such that the metal layer is electrically coupled (48) to the shielding means. The diaphragm with the coated metal layer effectively covers the speaker opening to prevent transmission of spurious electromagnetic or radio frequency radiation through the speaker opening. In the preferred embodiment of the invention, the metal layer is a sputtered coating and is applied to one side of the diaphragm.

12 Claims, 1 Drawing Sheet

SHIELDED SPEAKER

TECHNICAL FIELD

This invention relates in general to sound producing devices, and more particularly to EMT shielded electronic devices.

BACKGROUND

Speakers are a well-known component used in many types of electronic devices, such as televisions, radios, telephones, video games, computers, alarm clocks, automobiles, and even calculators. Many of these products contain electronic components or assemblies that emit unwanted electromagnetic or radio frequency signals. In other cases, the electronic components themselves are susceptible to interference by these signals, thereby degrading the performance of the device. This phenomenon is known collectively as EMI or RFI interference and is well known in the art. Radios and computers, have a great need to shield the interior components and the user from undesirable radiation.

This transmission of radiation into and out of radio and cellular telephone housings poses a problem for radio performance and compliance to federal regulations. While many techniques exist for providing shielding of the housing, the problem of shielding the housing openings required to accommodate speakers in these devices continues to exist.

Numerous schemes have been invoked, such as placing metal mesh or screen over the openings, or using metallized felt, in order to shield the openings from EMI and RFI. However, these approaches suffer from the disadvantage of requiring extra materials and labor to fasten the screen or shield in place in the housing and to make it electrically connected to the housing. Typically, the Shields are glued or welded into place, and this is an expensive and cumbersome secondary operation. The speaker opening is typically hard to shield because the opening must be acoustically transparent. Sometimes the speaker is located outside of the shielded area, requiring additional space in the product. A method of providing an EMI/RFI shielded speaker would be highly desirable and a welcome addition to the art.

SUMMARY OF THE INVENTION

Briefly, according to the invention, there is provided a shielded electronic device.

The device consists of a housing that has an opening for a speaker and a shielding means contained within the housing. The speaker has a diaphragm coated with a metal layer. Disposed within the housing is an electronic device that is susceptible to or emits electromagnetic radiation. The electronic device is coupled to the speaker and the speaker is mounted in the housing such that the metal layer is electrically coupled to the shielding means. The diaphragm with the coated metal layer effectively covers the speaker opening to prevent transmission of spurious electromagnetic or radio frequency radiation through the speaker opening.

In the preferred embodiment of the invention, the metal layer is a sputtered coating and is applied to only one side of the diaphragm. The unwanted electromagnetic or radio frequency radiation (EMF) is prevented from passing through the diaphragm.

DETAILED DESCRIPTION OF THE PREFERRED EMBODIMENT

Figure 1:
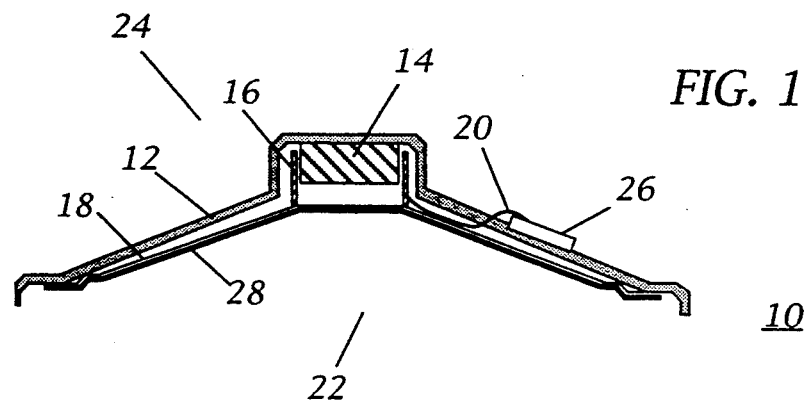
FIG. 1 is a cross-sectional view of a shielded speaker in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a speaker 10 has a metal frame or basket 12 that serves as the support structure for the speaker. A magnet 14 is centrally located in the frame 12 and a diaphragm or cone 18 is formed across the front side 22 of the speaker 10. A voice coil 16 circumferentially surrounds the magnet 14 and is affixed to the diaphragm 18. Coil lead wires 20 extend from the voice coil 16 to a position on the back side 24 of the speaker 10. The coil lead wires 20 typically terminate in terminals 26 that are used to electrically connect the speaker to the electronic device: In many prior art speakers, the diaphragm 18 was a paper-type material that was impregnated with various materials in order to give it the desired properties. Newer speaker contain a diaphragm made from plastic film, such as mylar, polyimide, polyamide, polyetherimide, polypropylene and many other types of polymers. These types of speakers find particular use in small, hand-held electronic products.

In order to provide a speaker with shielding functions, the front surface of the diaphragm 18 is coated with a metal layer 28. By providing a metal layer or coating 28 across the surface of the diaphragm, the speaker effectively provides an EMI/RFI shield that prevents unwanted radiation or signals from being transmitted from the front side 22 to the rear side 24 of the speaker. It is important that the metal coating or layer 28 does not affect the acoustic performance of the speaker 10. Therefore, the metal coating 28 must be deposited in a very thin layer so as not to significantly alter the weight or the stiffness of the diaphragm, but thick enough to provide a sufficient EMI shielding effect. Any changes in the properties of the diaphragm will profoundly affect the acoustical performance of the speaker. In the preferred embodiment, the metal coating 28 is deposited on the diaphragm 18 by sputter deposition or other vacuum deposition techniques. It is important to note that the diaphragm 18 should be metallized with the speaker completely assembled rather than metallizing a plastic film and then attempting to assemble the plastic film into a speaker.

Speakers utilizing solid metal diaphragms are well known in the art. However, these speakers suffer from the disadvantage of having a very limited frequency range. Typically, these types of speakers are used only to reproduce high-frequency sounds and need to be supplemented by other speakers that can produce the rest of the audio spectrum. These types of solid metal diaphragm speakers are typically known as tweeters. While a tweeter with a solid metal diaphragm or cone could effectively provide EMI/RFI shielding from the front to the back side of the tweeter, it cannot provide the full spectrum audio response desired in most situations. Solid metal diaphragms have not been found to be suitable for full-range audio speakers because of the stiffness of the solid metal and the need for the diaphragm to undergo greater excursions at lower frequencies. By coating the conventional polymer speaker diaphragm with an extremely thin layer of metal, the desirable mechanical properties of the diaphragm are not changed and a speaker having shielding capabilities can be produced that can reproduce a full-range audio spectrum. Typically, the metal coating that is deposited on the diaphragm 18 is in the range of angstroms, typically from 500 to 50,000 angstroms. In most cases, a thinner coating will provide superior audio performance. However, one must balance the need for electrical conductivity with this performance. A coating of sufficient thickness must be provided in order to create the desired level of electrical conductivity that will produce the shielding effect. Depending upon the conductivity required, typical coating thicknesses are in the range of 5,000–10,000 angstroms. Many metals may be used to coat the diaphragm, but those skilled in the art will realize that materials such as aluminum, titanium, or chrome are preferred because of their low cost, ease of sputtering and high adhesion to polymer films. While aluminum may be preferred for low cost and conductivity, chrome is a preferred coating for providing a much improved appearance and also corrosion resistance.

It is important to note that the coating 28 is shown in FIG. on the front side only of the speaker and only on one side of the diaphragm 18. However, in some situations, the designer may choose to apply the coating on the back side of the diaphragm or on both sides of the diaphragm. The coating 28 may also be formed selectively in a pattern and does not necessarily need to cover the entire surface. Patterns such as checkerboards or meshes may be used as long as the openings in the mesh are such that they will not pass radiation at the selected frequencies.

Figure 2:
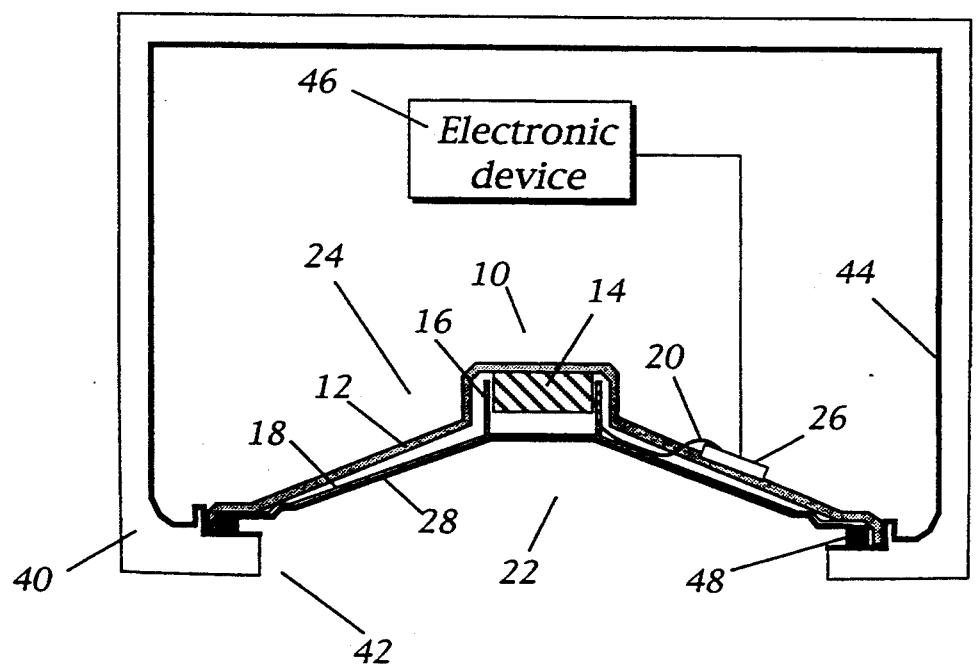
FIG. 2 is a cross-sectional view of a communication device in accordance with the present invention.

The shielded speaker as described in the instant invention may also be used in electronic devices that are susceptible to electromagnetic radiation or that emit electromagnetic radiation. Referring now to FIG. 2, a housing 40 contains an electronic device or a communication device 46. The electronic device may be a radio receiver or a combination receiver/transmitter, or a computer, or other type of device that either emits or is susceptible to EMI/RFI interference. The housing 40 contains an opening 42 for a speaker. The housing 40 typically has a shielding means 44 as a part of the housing. Shielding means 44 is typically a metal coating when the housing is plastic, or if the housing is metal, the shielding is the housing. The speaker 10 is mounted in the housing opening 42 and electrically coupled to the electronic device 46. The speaker 10 is mounted in the opening 42 such that the metal layer 28 is electrically coupled to the shielding means 44. The metal layer on the speaker is coupled to the shielding means in one embodiment using a conductive polymer 48, such as a conductive elastomer or a conductive epoxy. It may also be mechanically coupled using solder, bolts, springs, clips, wire braid, etc. Mounted in this arrangement, it can be seen that the speaker 10 covers the speaker opening and effectively prevents the transmission of spurious electromagnetic or radio frequency radiation through the speaker opening 42. This then will shield the electronic device from unwanted signals entering the housing or it will contain unwanted signals emitted by the electrical device within the housing.

When used in conjunction with a housing that has a shielding means, the shielded speaker of the instant invention provides an electrical seal around the speaker opening, thereby effectively electrically isolating the electronic device contained in the housing.

One skilled in the art will certainly appreciate that a speaker formed in the manner of the instant invention eliminates the need for metal meshes, felts, grilles, and other types of additional piece parts that are typically used in the art. The speaker can be metallized after assembly and because vacuum metallization techniques are inexpensive, the additional cost to fabricate a shielding speaker is extremely small. In addition, it provides an added benefit of reduced product size, because additional parts are not required to shield the opening, thus giving the designer more freedom to create a low-cost or aesthetically pleasing product.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A shielded electronic device that is susceptible to electromagnetic radiation or that emits electromagnetic radiation, comprising:
   a housing having a speaker opening and a shielding means;
   a speaker having front and back sides and a diaphragm coated with a metal layer;
   the electronic device disposed within the housing and coupled to the speaker;
   the speaker mounted in the housing with the metal layer electrically coupled to the shielding means, thereby covering the speaker opening to prevent transmission of spurious electromagnetic or radio frequency radiation through the speaker opening.

2. The shielded electronic device of claim 1, wherein the metal layer is electrically coupled to the housing shielding means with a conductive polymer.

3. The shielded electronic device of claim 2, wherein the speaker diaphragm is a plastic film.

4. The shielded electronic device as described in claim 2, wherein the metal layer prevents the transmission of spurious electromagnetic or radio frequency radiation through the diaphragm.

5. The shielded electronic device of claim 2, wherein the metal layer is a sputtered metal coating.

6. The shielded electronic device of claim 2, wherein the diaphragm is coated with the metal layer on one side only.

7. A communication device, comprising:
   a housing having a speaker opening and a shielding means;
   a speaker having front and back sides and a diaphragm coated with a metal layer;
   a radio receiver disposed within the housing and coupled to the speaker;
   the speaker mounted in the housing with the metal layer electrically coupled to the shielding means, and the speaker covering the speaker opening to prevent the ingress or egress of spurious radio frequency radiation through the speaker opening.

8. The communication device of claim 7, wherein the metal layer is electrically coupled to the shielding means with a conductive polymer.

9. The communication device of claim 7, wherein the speaker diaphragm is a plastic film.

10. The communication device of claim 7, wherein the metal coating is a sputtered metal coating.

11. The communication device of claim 7, wherein the diaphragm is coated with the metal layer on one side only.

12. The communication device of claim 7, further comprising a radio transmitter disposed within the housing, the communication device thereby comprising a two-way radio.

* * * * *

UNITED STATES PATENT AND TRADEMARK OFFICE
CERTIFICATE OF CORRECTION

PATENT NO. : 5,406,038

DATED : April 11, 1995

INVENTOR(S) : Reiff, et al.

It is certified that error appears in the above-identified patent and that said Letters Patent is hereby corrected as shown below:

In the Title:
Cover page, col. 1, delete "SHIELDED SPEAKER" and insert therefor -- SHIELDED ELECTRONIC DEVICE --.

In the Abstract:
Cover page, col. 2, line 1, after "shielded" delete "speaker. The speaker (10) has a diaphragm (18)".

Cover page, col. 2, delete lines 2 through 5 in their entirety.

Cover page col. 2, line 6, delete "alternate embodiment of the invention, a shielded".

Cover page col. 2, line 7, after "device" delete "is provided. The device consists of a".

Cover page col. 2, line 7, before "housing" insert -- A --.

Cover page col. 2, line 8, after "(40)" delete "that".

Cover page col. 2, line 10, after "diaphragm" and before "coated" insert -- (18) --.

UNITED STATES PATENT AND TRADEMARK OFFICE
CERTIFICATE OF CORRECTION

PATENT NO. : 5,406,038
DATED : April 11, 1995
INVENTOR(S) : Reiff, et al

It is certified that error appears in the above-indentified patent and that said Letters Patent is hereby corrected as shown below:

Cover page col. 2, line 10, at the end of the line after "layer" insert -- (28) --.

Cover page col. 2, line 11, after "device" and before "that" insert -- (46) --.

UNITED STATES PATENT AND TRADEMARK OFFICE
CERTIFICATE OF CORRECTION

PATENT NO. : 5,406,038
DATED : April 11, 1995
INVENTOR(S) : Reiff, et al

It is certified that error appears in the above-indentified patent and that said Letters Patent is hereby corrected as shown below:

Column 1, line 1, delete "SHIELDED SPEAKER" and insert therefor -- SHIELDED ELECTRONIC DEVICE --.

Column 1, line 7, delete "EMT" and insert therefor -- EMI --.

<u>In the Claims</u>:

Column 6, line 3, after "claim" delete "7" and insert therefor -- 11 --.

Signed and Sealed this

Eighteenth Day of July, 1995

Attest:

BRUCE LEHMAN

*Attesting Officer*    *Commissioner of Patents and Trademarks*